June 24, 1930. W. J. BOYER 1,766,218
CROSS CHAIN
Filed June 16, 1923
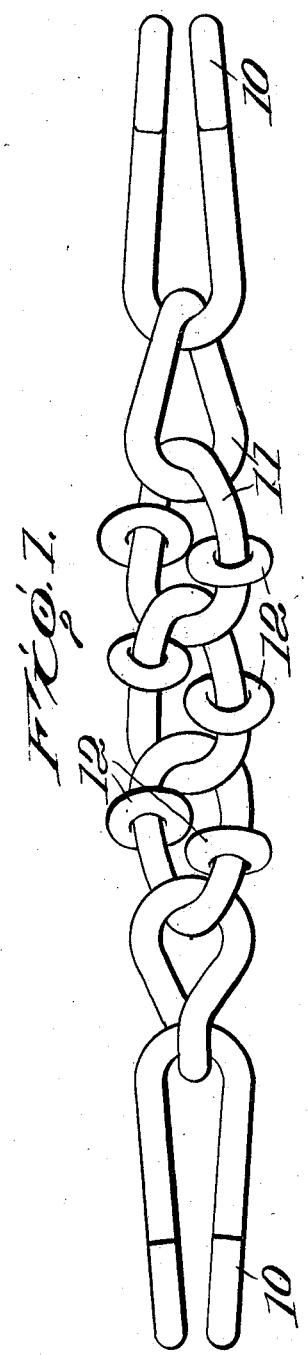
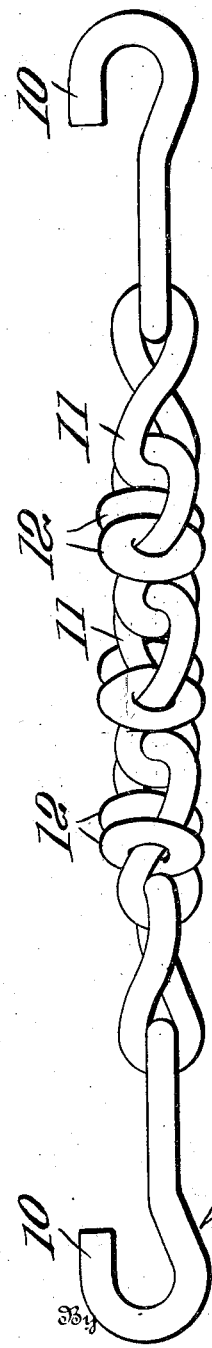
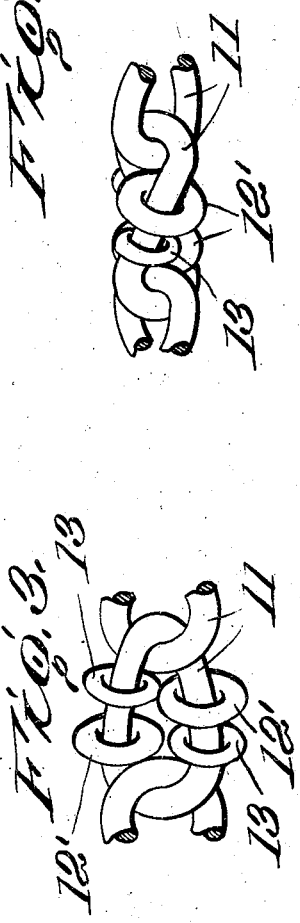
Inventor
WILLIAM J. BOYER
By Brown & Phelps
Attorneys Patented June 24, 1930

1,766,218

UNITED STATES PATENT OFFICE

WILLIAM J. BOYER, OF WILMINGTON, DELAWARE

CROSS CHAIN

Application filed June 16, 1923. Serial No. 645,795.

The invention relates to cross chains for anti-skid chains for vehicle wheels and has as an object the provision of a cross chain which will have a maximum resistance to skidding, and which will provide an effective protection of the links of the chain against wear.

Further objects of the invention will appear from the following description when read in connection with the accompanying drawing showing an illustrative embodiment of the invention and wherein, Fig. 1 is a plan view.

Fig. 2 is a side elevation of a single cross chain.

Fig. 3 is a detail plan view, and

Fig. 4 is a detail side elevation of a modification.

As will be readily understood by those skilled in the art, the chain shown in the drawing is intended to be attached by means of hooks 10, to side chains running circumferentially of the wheel, a plurality of chains such as that illustrated being used upon each tire.

The invention is applicable to cross chains formed of twisted links 11 of a usual and well known type. To protect the links from wear against the road surface there are shown rings 12 placed upon each link. The rings 12 are preferably formed of round material bent into annular form surrounding the wire of the links 11. It is essential that the rings 12 be free for revolution upon the wire of the links 11 in order that the wear upon the circumference of the rings may be distributed throughout the outer surface thereof. The wear upon the links 11 as heretofore commonly used has been entirely upon the surface of the links in one place where the same contacted with the road surface with the result that the links were quickly worn through at this place and the chain became useless. With the present invention while the rings would wear through as quickly as the links of the chain have done if they were motionless upon the links, yet by reason of their freedom for revolution and the consequent distribution of the wear evenly about the circumference, the life of each ring is many times that of the links as heretofore used.

The rings are placed upon the portion of the links which is raised from the bottom surface as shown in Figure 2, so that said bottom surface of the completed chain is substantially smooth, the diameter of the material of the rings being substantially equal to that of the wire of the links and therefore extending downward from its position upon the link substantially to a level with the portion of the next link engaged with the link in question adjacent to the position of the ring thereon. In other words both the ring and the link being of substantially the same diameter, and both engaging the link upon which the ring is seated, will project downward therefrom an equal distance. This being true of each of the rings as related to the adjacent link, the surface of the chain in contact with the tire will be comparatively smooth. This relation of ring to link not only provides a substantially smooth surface upon the lower side as shown in Figure 2, which in use is placed in contact with the tire, but also results in a ridged surface upon the opposite side of the chain, composed, where it contacts with the road surface, entirely of the rings 12.

As shown in Figures 3 and 4, a plurality of rings may be placed upon each side of each link. In this modification the rings 12' can be substantially like the rings 12. Since the rings 13 must be placed upon a portion of the link 11, differing in elevation from the line shown as a base in Fig. 4 from the position of rings 12', the diameter of the material of the rings 13 must be different from that of rings 12' when placed as shown in Figs. 3 and 4. With the rings 13 at a higher point upon the side of the link the diameter of the ring 13 must be less in order to bring its upper surface in the plane of the top of rings 12'. The essential requirement in the use of a plurality of rings is that they shall be of different diameter to compensate for the variation of their position upon the links.

When the wheel, equipped with cross chains embodying the invention, attempts to skid, the rings will bind with each other and each ring will assume an angular position upon the wire of the link upon which it is placed so as to bind thereon, thus providing an efficient grip for the tire upon the road surface. Since the wire which serves as an axis for revolution of the rings is not parallel to the road surface nor directly perpendicular to the line of travel of the vehicle, it results that when the rings are in contact with the road surface they will be prevented from free revolution upon the links and will therefore provide an efficient grip upon the road for transmission of driving or braking stresses between the wheel and the road.

Minor changes may be made in the physical embodiment of the invention without departing from its spirit.

I claim:

1. A cross chain comprising, in combination, a series of twisted links, a plurality of rings upon each side of each link, the material of which said rings is formed differing in diameter whereby the rings may fall into a common plane with each other.

2. A cross chain comprising in combination, a link, a ring tiltably mounted on a side of said link and having an internal diameter so related to the gauge of the material of the link as to bind therewith when tilted thereon.

3. A cross chain comprising, in combination, a twisted link, a ring revolubly and tiltably mounted on a side of said link, the internal diameter of the ring being so related to the gauge of the material of the link as to cause the ring to bind therewith when tilted thereon.

4. A cross chain comprising, in combination, an elongated link, a ring tiltably mounted on each side of said link, the internal diameter of each ring so related to the gauge of the material of the link as to cause the ring to grip the link when tilted, the gauge of the material of said rings being more than one-half of the distance between the sides of the link.

WILLIAM J. BOYER.